July 24, 1934.  D. G. ROOS  1,967,539
FREEWHEELING DEVICE
Filed Feb. 25, 1932  2 Sheets-Sheet 1
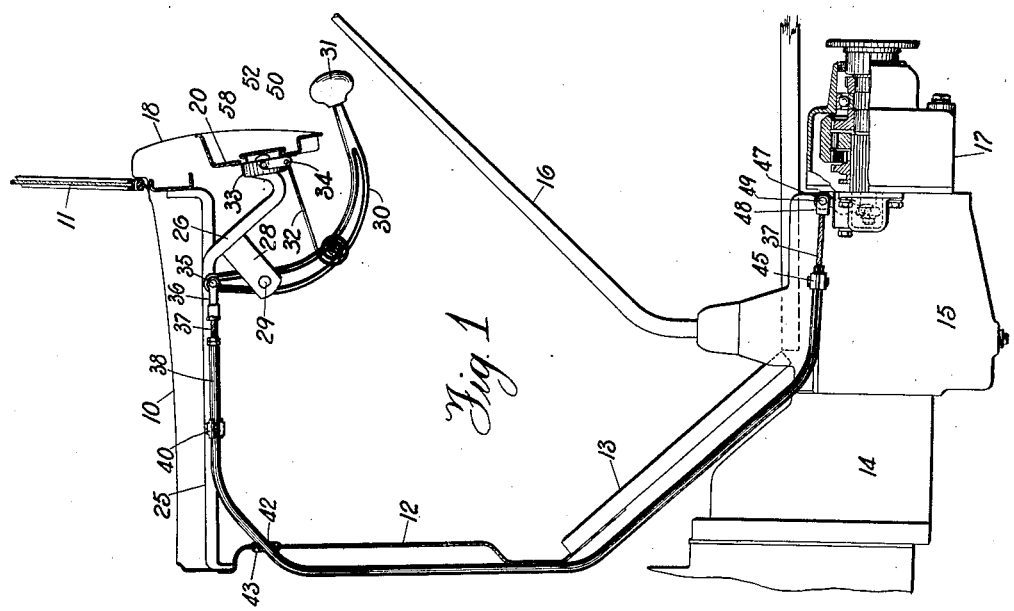
INVENTOR.
Delmar G. Roos
BY
ATTORNEYS.

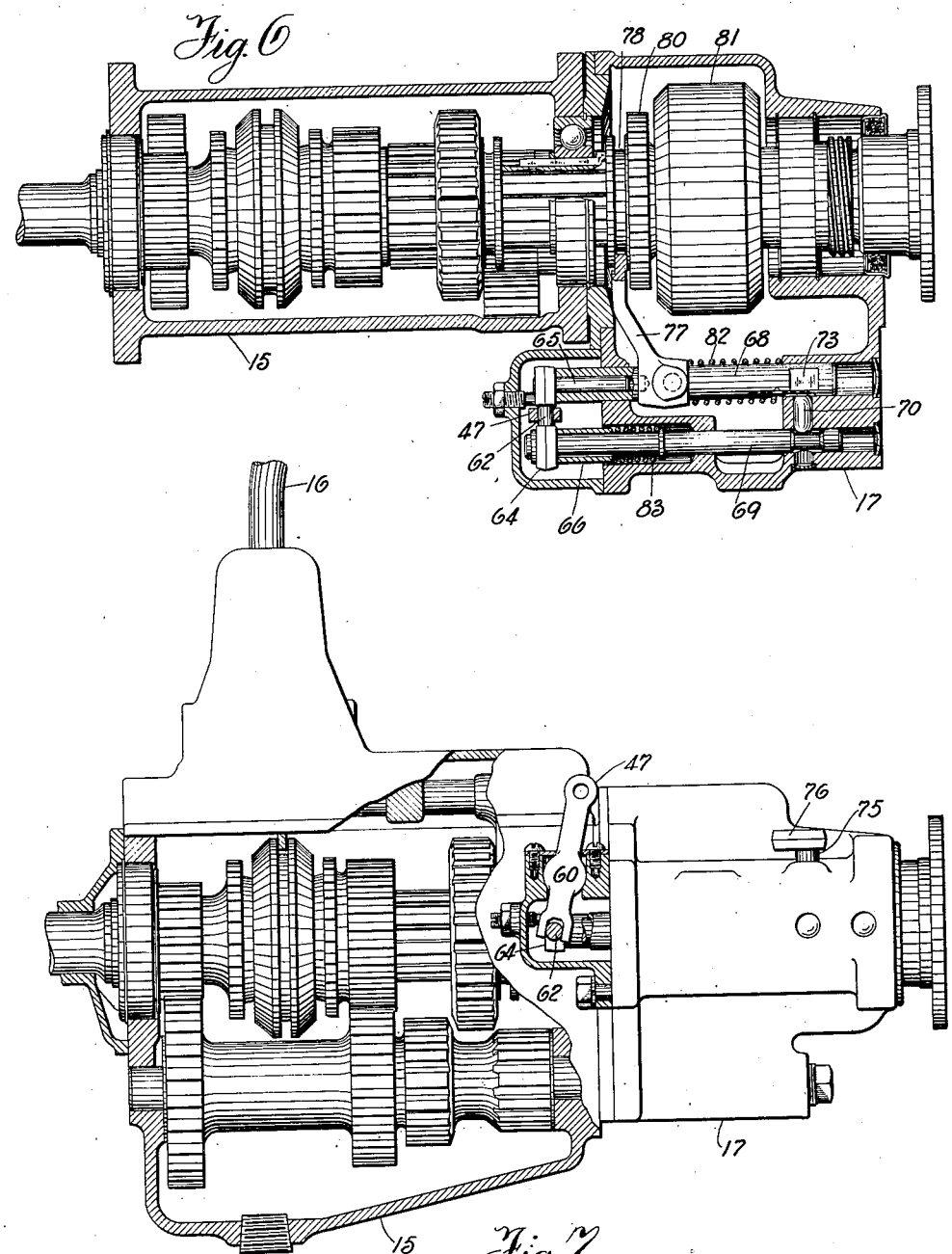

Patented July 24, 1934

1,967,539

UNITED STATES PATENT OFFICE 1,967,539

FREEWHEELING DEVICE

Delmar G. Roos, South Bend, Ind., assignor, by mesne assignments, to Free Wheeling Patents Corporation, South Bend, Ind., a corporation of Delaware Application February 25, 1932, Serial No. 595,142

9 Claims. (Cl. 192—99)

This invention relates to a free wheeling device and particularly to a manual control for rendering a free wheeling device operative or inoperative so that the vehicle upon which it is mounted may be driven in either free wheeling or conventional gear at the will of the operator, and has for its principal object the provision of a manual control for a free wheeling device together with a visible indicator for disclosing whether the manual control is set for free wheeling or conventional drive.

A further object resides in the provision of a manual control which is easily accessible to the operator of the vehicle, easy to operate and is quiet and positive in its action.

It is a still further object to provide a control of the character described which will not take up any room inside of the vehicle which would be otherwise available to the occupant of the vehicle.

It is also an object to provide in combination with a manual control of the character described, a visible indicator for disclosing whether the manual control is set for free wheeling or conventional drive, and particularly to provide such an indicator mounted upon the instrument board of the vehicle and in the line of vision of the operator, the marking on the indicator being of a sufficient size and sufficiently clear so that the operator can easily determine whether the control is set for free wheeling or conventional drive.

It is an additional object to provide a device of the character described which is economical and simple to manufacture, easy to operate and which will not readily get out of order in use.

Other objects and advantages wll appear as the description proceeds.

A single embodiment of the idea of this invention is illustrated in the accompanying drawings. The drawings, however, are not to be taken as limiting the invention, the scope of which is to be measured entirely by the scope of the copending claims.

In the drawings:

Figure 1 is a vertical sectional view through the forward part of the vehicle immediately in front of the driver's seat and shows in section the instrument panel, dash panel, floor boards, clutch casing, together with the transmission, gear shift lever and free wheeling unit with a control device constructed according to the idea of this invention applied thereto.

Figure 2 is a fragmentary elevational view of the instrument panel showing an indicator constructed according to the idea of this invention mounted therein, the indicator in this figure showing the control set for free wheeling.

Figure 3 is a view similar to Figure 2, showing the indicator when the control member is set for conventional drive.

Figure 4 is an elevational view of the indicator showing the actuating arm in position to give the reading illustrated in Figure 2.

Figure 5 is an elevational view of the indicator showing the actuating arm in position to give the reading illustrated in Figure 3.

Figure 6 is a horizontal sectional view of a transmission and free wheeling unit and a mechanism for actuating a free wheeling unit to render it operative or inoperative so that the vehicle may be driven in either free wheeling or conventional gear.

Figure 7 is an elevational view of the transmission and free wheeling unit illustrated in Figure 6, a portion thereof being broken away to better illustrate the construction thereof.

Referring to the drawings in detail, and particularly to Figure 1, the numeral 10 indicates the cowl of an automobile body, that is, the portion of the body between the windshield 11 and the dash panel 12. Numeral 13 indicates the toe board immediately in front of the driver's seat in a conventional vehicle; 14 indicates the clutch casing of the vehicle; 15 the transmission; 16 the gear shift lever, and 17 generally indicates a free wheeling unit mounted upon the rear of the transmission 15. The numeral 18 indicates the instrument board of the vehicle immediately in front of the driver's seat, and the numeral 20 indicates an instrument panel mounted in the board 18. A brace member 25 extends from the panel 12 to the instrument board 18 and has at the end adjacent the instrument board a depending leg portion 26 secured to the instrument panel to brace the same against vibration. This brace member 25 is secured to the dash panel and to the instrument board and the instrument panel by means of angularly bent portions at the ends thereof.

A bracket member 28 extends downwardly and forwardly from the leg 26 and on this bracket member is mounted by means of a pivot pin 29 a crescent shaped lever 30, preferably of I section, having a knob 31 fixed upon one end thereof. The pivot pin 29 is near the end of the lever opposite the knob 31, and between the pin 29 and the knob 31 is a member, comprising a coil spring 32 having a spirally wound portion mounted on the lever and a straight portion extending toward the instrument panel and connected at its free end to an indicator 33 at 34. The end of the lever 30 opposite the knob 31 is connected by means of a pivot pin 35 and clevis 36 to a cable 37. This cable 37 extends through a tube 38 which extends along the brace 25 and is secured thereto by means of a clamp 40 and extends through an aperture 42 in the dash panel 12 being cushioned therein by means of a rubber cushion 43. The tube then extends downwardly across the dash panel 12 and under the toe board 13 to the rear portion of the transmission to which it is secured by means of a clamp element 45. The cable 37 extends out of the lower end of the tube and is connected to an arm 47 by means of a clevis 48 and a pin 49. The arm 47 is operatively connected with the actuating mechanism of the overrunning clutch mechanism generally indicated at 17.

It will be observed from the description so far, that actuation of the knob 31 about an arc having the pivot pin 29 as a center will push the cable 37 through the tube 38 to move the arm 47 to actuate the overrunning clutch device 17.

The spring 32 is connected at 34 to an arm 50 which in turn is connected to a member in the form of a cylindrical sector 52 having legends 53 and 54 upon the face thereof as indicated in Figures 2 and 3. The member 52 is pivotally mounted in an instrument casing 57 having a dial 58 upon the face thereof. The dial 58 is provided with a slot 59 indicated in Figures 2 and 3 through which one of the legends 53 or 54 is visible depending upon the position of the member 52. As the position of the member 52 is controlled by the position of the lever 30 it is apparent from this description that the visible indicator will disclose whether the arm is set for free wheeling or conventional drive. The positions of the arm 50 as illustrated in Figures 4 and 5 are such that the instrument indicates free wheeling and conventional drive as illustrated in Figures 2 and 3 respectively.

Referring to Figures 6 and 7 it will be observed that the arm 47 is pivotally mounted at 60 and is operatively connected at 62 with a yoke element 64. A pin 65 and a sleeve 66 are positively secured to the yoke element 64 upon opposite sides of the arm 47. A sleeve 68 fits over the pin 65 and is slidably supported in bearings provided in an extension of the casing of the free wheeling unit 17. A pin 69 fits into the sleeve 66 and is likewise slidably secured in bearings provided in an extension of the casing of the free wheeling element. A detent 70 is arranged between the sleeve 68 and the pin 69 and the sleeve 68 is provided with a slot 73 adapted to be engaged by a lock element 75 actuated to operative and inoperative positions by a lever member 76. A shifter fork 77 is mounted on the sleeve 68 and engages in a groove 78 on a clutch element 80 which carries peripheral teeth meshing with internal gear teeth in the cylindrical member 81. Longitudinal motion of the sleeve 68 will move the shifter fork 77 to move the clutch element 80 into or out of meshing relation with the clutch teeth in the cylindrical element 81, thereby rendering the overrunning clutch device operative or inoperative. Compression springs 82 and 83 are provided to render the actuating mechanism semi-automatic in character so that the clutch member 80 will be moved into engagement with the member 81 only when the vehicle clutch is depressed and the clutch teeth on the member 80 are in meshing relation with the clutch teeth on the member 81.

Figures 6 and 7 also illustrate various mechanical elements of the transmission mechanism, but as these form no part of the present invention, a specific description thereof is not believed necessary for the purpose of this disclosure.

Having now described my invention so that others skilled in the art may clearly understand the same, what I desire to secure by Letters Patent is as follows:

1. In combination with a vehicle transmission for transmitting power from a driving to a driven element, and a free wheeling device adapted to permit or prevent overrun of the driven element relative to the driving element; a control device comprising, a lever pivotally supported on a fixed part of said vehicle, a cable extending from one end of said lever and operatively connected to said free wheeling device, a rigid tube surrounding said cable extending from a point adjacent to the end of said lever to a point adjacent to said free wheeling device and rigidly clamped to said vehicle, and an instrument operatively connected with said lever for indicating a one-way and a two-way drive.

2. In combination with a vehicle having an instrument board, a transmission for transmitting power from a driving to a driven element, and a free wheeling device adapted to permit or prevent overrun of the driven element relative to the driving element; a control device comprising, a lever pivotally mounted on a fixed part of said vehicle immediately below said instrument board, means operatively connecting one end of said lever with said free wheeling device to control the latter, and means operated by said lever to indicate a one-way and a two-way drive.

3. In combination with a vehicle having an instrument board, a transmission for transmitting power from a driving to a driven element, and a free wheeling device adapted to permit or prevent overrun of the driven element relative to the driving element; a control device comprising, a lever pivotally supported adjacent to said instrument board, means operatively connecting one end of said lever with said free wheeling device, and an indicating instrument mounted in said instrument board operatively connected with said lever for disclosing the condition of said free wheeling device.

4. In combination with a vehicle transmission for transmitting power from a driving element to a driven element, and means associated therewith operable to permit or prevent overrun of the driven element relative to the driving element; a control device for said means supported by a fixed part of said vehicle, and indicating means operable with said control device for indicating the condition of said first-named means.

5. In combination with a vehicle transmission for transmitting power from a driving element to a driven element, and a free wheeling device associated therewith adapted to permit or prevent overrun of the driven element relative to the driving element; a control device for said free wheeling device having a part extending immediately below the vehicle instrument board, and indicating means operatively connected with said control device for indicating whether the driven element may overrun the driving element or if the driven element is constrained against overrun of the driving element.

6. In combination with a vehicle having an instrument board, an instrument panel in said instrument board, a transmission for transmitting power from a driving to a driven element, and a free wheeling device adapted to permit or prevent overrun of the driven element relative to the driving element; a control device for said free wheeling element comprising a lever pivotally mounted adjacent to said instrument board, means operatively connecting said lever with said free wheeling device, and an indicating instrument operatively connected with said pivotally mounted lever for disclosing the condition of said free wheeling device, said instrument being mounted in said instrument panel and grouped with other instruments mounted therein.

7. In combination with a vehicle having an instrument board, an instrument panel in said instrument board, a transmission for transmitting power from a driving to a driven element, and a free wheeling device adapted to permit or prevent overrun of the driven element relative to the driving element; a control device for said free wheeling device comprising, a lever pivotally mounted adjacent to said instrument board operatively connected with said free wheeling device, and an indicating instrument mounted in said instrument panel and operatively connected with said pivotally mounted lever for disclosing the condition of said free wheeling device, said instrument comprising, an instrument casing, a cylindrical sector having legends thereon pivotally mounted in said instrument casing, an arm secured to said sector operatively connected with said pivotally mounted lever whereby a change in the position of said lever will cause a corresponding change in the position of said sector, a dial for said instrument, and a slot in said dial through which one or the other of said legends are visible.

8. In combination with a vehicle having an instrument board, a transmission for transmitting power from a driving to a driven element, and a free wheeling device adapted to permit or prevent overrun of the driven element relative to the driving element; a control device for controlling said free wheeling device comprising, a lever pivotally mounted adjacent to said instrument board, means operatively connecting said lever with said free wheeling device, an indicating instrument mounted on said instrument board for disclosing the condition of said free wheeling device, and means for connecting said lever and said instrument comprising, a spring having a spirally wound part rigidly mounted on said lever and a straight part extending from said spirally wound part pivotally connected to an element of said instrument.

9. In combination with a vehicle having an instrument board, a transmission for transmitting power from a driving to a driven element, and a free wheeling device adapted to permit or prevent overrun of the driven element relative to the driving element; a control for said free wheeling device comprising, a relatively long crescent-shaped lever having a knob upon one end thereof extending beneath said instrument board pivotally mounted near one end thereof adjacent to said instrument board, a cable slidable in a surrounding tube connecting the opposite end of said lever with said free wheeling device to control the latter, and means operated by said lever to indicate a one-way and a two-way drive.

DELMAR G. ROOS.